United States Patent [19]
Peisker et al.

[11] Patent Number: 4,689,190
[45] Date of Patent: Aug. 25, 1987

[54] METHOD OF AND APPARATUS FOR MOLDING A COMPOSITE FLUOROCARBON HELIX SEAL

[75] Inventors: Glenn Peisker, Barrington; Keith Christiansen, Fox River Grove; Gil Jaime, West Dundee, all of Ill.

[73] Assignee: Chicago Rawhide Mfg. Co., Elgin, Ill.

[21] Appl. No.: 662,685

[22] Filed: Oct. 19, 1984

Related U.S. Application Data

[62] Division of Ser. No. 563,149, Dec. 19, 1983, Pat. No. 4,501,431.

[51] Int. Cl.⁴ .................. B29C 33/14; B29C 39/10; B32B 31/06
[52] U.S. Cl. .......................... 264/159; 29/417; 29/527.1; 264/262; 264/277; 264/293; 277/1; 425/124; 425/127; 425/385; 425/DIG. 47
[58] Field of Search ............ 264/159, 261, 262, 271.1, 264/277, 127, 138, 293; 425/DIG. 47, 117, 124, 127, 385; 249/83, 87; 29/460, 469, 527.1, 417; 277/1, 134, 152, 208, 227, 228; 83/875

[56] References Cited

U.S. PATENT DOCUMENTS

| | | | |
|---|---|---|---|
| 3,939,551 | 2/1976 | Clark et al. | 264/293 X |
| 4,171,561 | 10/1979 | Bainard et al. | 425/DIG. 47 |
| 4,183,892 | 1/1980 | Corsi et al. | 425/DIG. 47 |
| 4,406,847 | 9/1983 | O'Neal et al. | 264/262 |
| 4,464,322 | 8/1984 | Butler | 264/271.1 |
| 4,542,573 | 9/1985 | Bainard | 29/417 |
| 4,578,856 | 4/1986 | Butler | 264/277 X |

*Primary Examiner*—Jeffery Thurlow
*Assistant Examiner*—Leo B. Tentoni
*Attorney, Agent, or Firm*—James T. FitzGibbon; Angelo J. Bufalino

[57] ABSTRACT

A method of manufacturing a composite seal assembly. A primary sealing ring in generally frustoconical form is cut from a cylindrical billet of a resinous fluorocarbon material so as to have first and second principal surfaces each inclined with respect to the axis of the billet. The ring thus formed is supported against movement by disposing a relatively rigid annular casing unit adjacent the ring, with the ring lying within the casing opening, and bonding the casing element to the seal ring by molding an elastomeric collar of thin cross-section between a portion of the second surface of the ring and a part of said casing.

8 Claims, 13 Drawing Figures

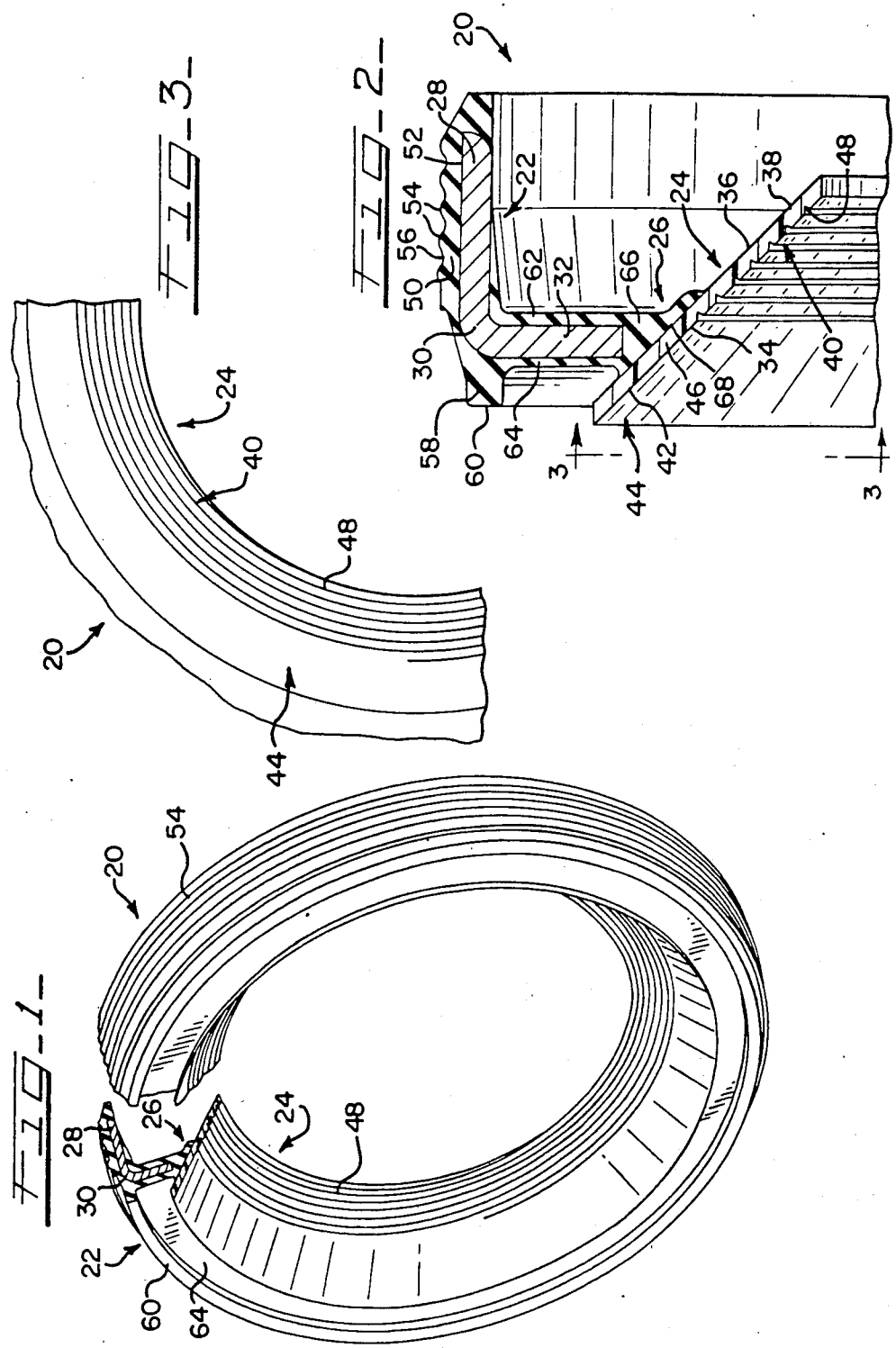

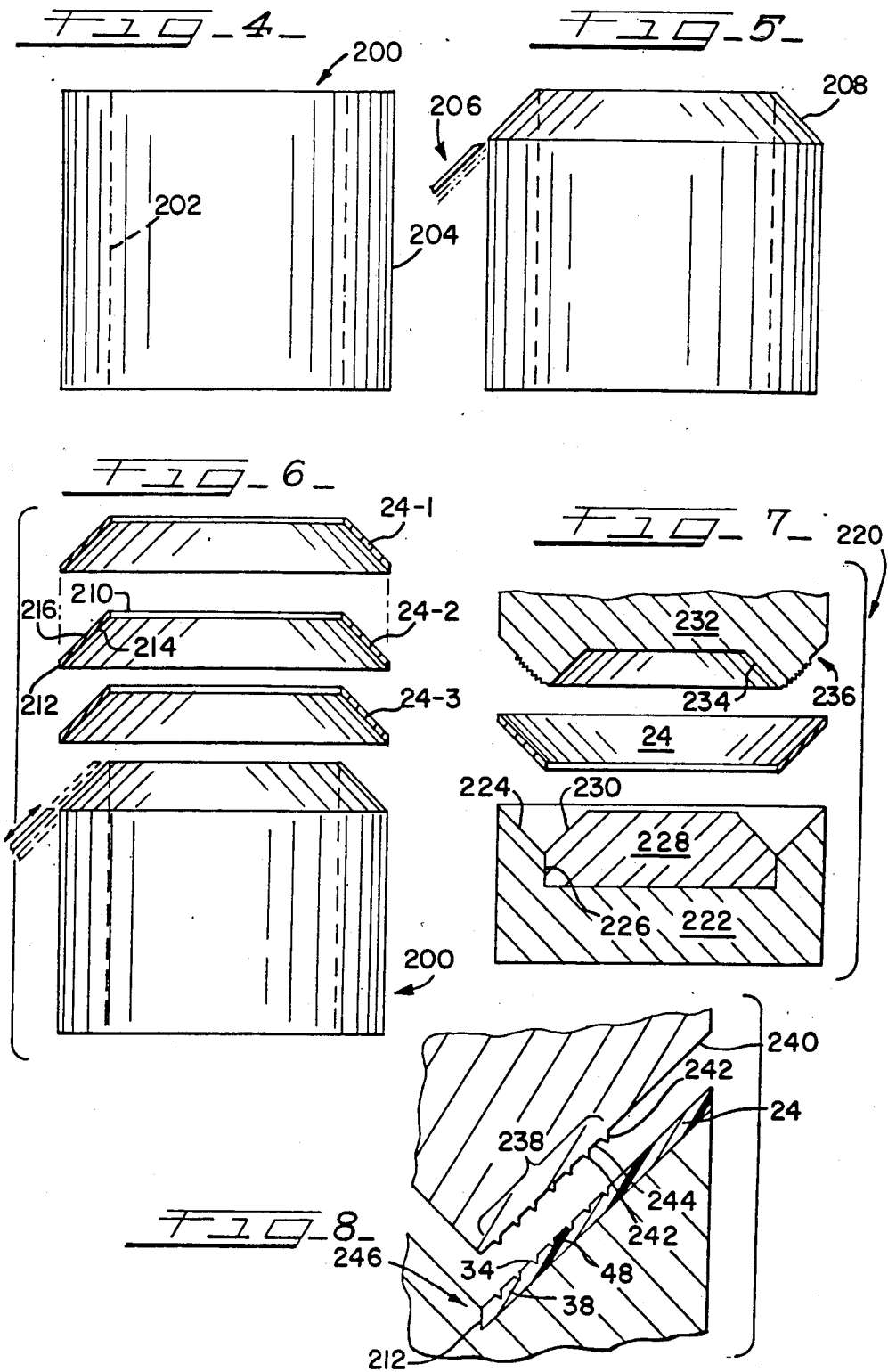

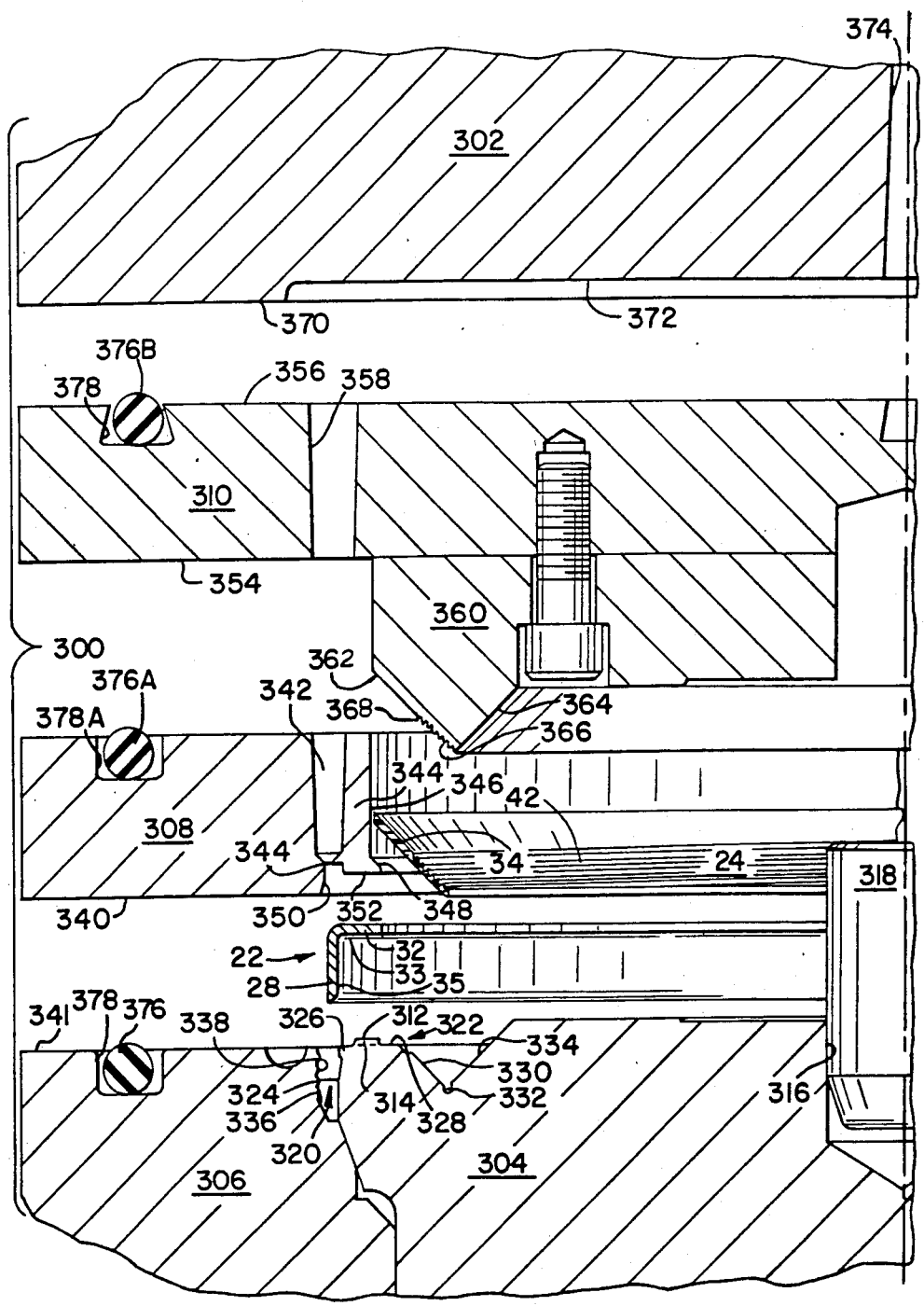

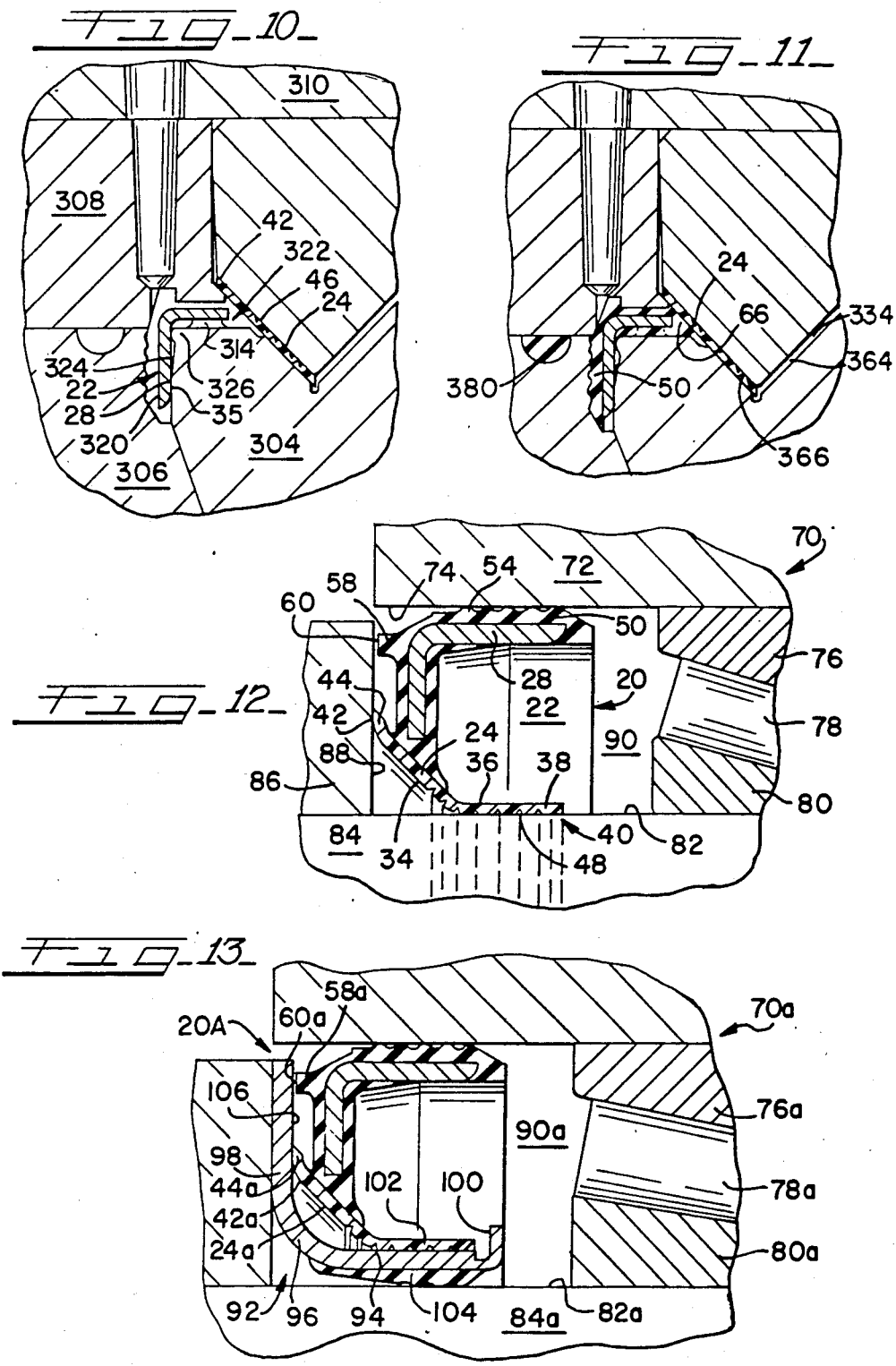

METHOD OF AND APPARATUS FOR MOLDING A COMPOSITE FLUOROCARBON HELIX SEAL

This is a division of application Ser. No. 563,149, filed 12-19-83, now U.S. Pat. No. 4,501,431.

The present invention relates to improved fluid seals for shafts and the like, and more particularly to seals constructed of specialty materials and adapted for a wide variety of applications.

Many years ago, specialty materials having low friction and favorable wear capabilities were developed, including fluorocarbon materials such as high polymers of tetrafluoroethylene (TFE), for example. These materials were considered as potentially advantageous for sealing applications, but at the time, they also had a number of drawbacks making their immediate application to seals somewhat difficult.

For example, the resinous materials per se were of plastic character; they were subject to cold flow; and furthermore, they were subject to being nicked or scratched during installation. Furthermore, being somewhat nonelastomeric, the matter of obtaining and retaining proper fit clearances and forces with with associated machine parts was a difficult matter. Since that time, filled or composite TFE and like materials have become known, with the composite materials thus made including a matrix or sheet made from a TFE resin but including substantial parts of inert filler materials, including but not limited to carbon black, glass fibers, other particulate materials and the like.

Because of the nonelastomeric character of the TFE materials, their ability to provide a static seal was in doubt, and hence the application of hydrodynamic sealing principles rather than purely hydrostatic considerations were believed desirable. Many TFE Seals have incorporated the various helices including screw threads, vanes, and the like, used with or without so called static lips, in an attempt to insure that whatever fluid material may leak past the intended seal band or primary area of contact between the seal and the associated shaft or like part would be returned to the seal cavity by a "pumping" action when there was relative motion between the seal and the seal surface.

In certain instances, various rather complex techniques were used in an attempt to assemble TFE-containing seals, inasmuch as the TFE is not easily bonded to a casing or other carrier, and in most cases, to rubber. In all or almost all of the foregoing cases, however, the problems of manufacturing and assembling the seal and in particular, problems of developing correct sealing lip or surface profiles and maintaining them during application was a serious problem which has not yet heretofore been entirely overcome. As a result of the desirable characteristics of TFE and related low friction materials, however there has been not only a continued, but actually a further renewed interest in using these materials for seals as their advantages have become more widely known.

According to the present invention, novel fluorocarbon seals are provided which include a formed resin ring element, which element is adapted, in a preferred form, to serve both as the primary lip and as an auxiliary or excluder lip; in which at least the portion of the lip surface contains hydrodynamic formations consisting of grooves or like indented or debossed surfaces rather than upstanding or protruding vanes or ribs; and wherein the resinour seal ring element as a whole is in the form of a generally frusto-conical ring having a intermediate portion thereof bonded by an annular collar unit to an associated casing, having one radially spaced apart portion acting as the primary lip surface and having a different diameter than the seal diameter at the bond area, and further having an auxiliary lip of a third diameter adapted to engage another relatively movable surface to form an excluder lip. Preferably, the seal also comprises an associated or accessory casing forming a wear sleeve or seal engagement surface so that the primary seal lip can be protected after manufacture and prior to and during installation.

According to the invention, novel methods of manufacturing the seal are also provided.

In view of the failure of the prior art to provide seal assemblies having low friction seal lip portions having certain desired advantages and characteristics, it is an object of the present invention to provide an improved fluid seal having a sealing element composed at least in part of a fluorocarbon resin material.

Another object of the invention is to provide such an improved seal having a sealing element which includes as an important part thereof a sealing element made of a resinous fluorocarbon material and being in the form of a frusto-conical ring element having inner outer, and intermediate diameters, at least one of which inner and outer diameters is adapted to provide a primary seal band surface, with the other providing an excluder lip surface.

Yet another object of the invention is to provide a method of making a fluorocarbon resin containing seal wherein the seal lip is made from a resinous element bonded to an elastomer which is in turn secured by bonding to a casing portion used to mount the seal.

Another object of the invention is to make an improved fluorocarbon resin containing seal which is of a unitized construction.

Still another object of the invention is to provide a method of making an improved seal having a primary sealing element of frusto-conical configuration and made from a fluorocarbon resin material.

A still further object of the present invention is to provide a seal having a fluorocarbon resin sealing ring of a frusto-conical configuration, and which includes sealing surfaces having hydrodynamic elements formed by debossing or grooving so as to minimize wear on these elements and still to provide hydrodynamic sealing action.

Another object of the present invention is to provide a seal manufacturing method which includes cutting a resinous fluorocarbon sealing ring element from a tubular cylindrical billet, forming hydrodynmanics elements in one face of the surface, and then positioning it in a mold wherein the element is bonded to an annular web which is simultaneously bonded to a seal casing unit so as to provide a seal unit with primary and auxiliary lip surfaces both made from the same seal element. Yet another object is to provide a seal unit wherein the seal ring, in the relaxed or as-formed condition is frusto-conical, but which assumes a bell-mouthed or otherwise modified configuration when installed.

A still further object of the ivention is to provide a seal unit having a tapered or beveled fluorocarbon containing resin element serving as a portion of the primary seal lip and being affixed to the seal casing by an elastomeric annular attachment collar extending between an exterior surface of the seal element and a part of the seal casing to provide a pivoting action whereby the forces tending to move the auxiliary lip into a desired position are increased by the increase in radial load occuring when the remainder of the seal ring is positioned for use.

The present invention achieves these and other objects and advantages by providing a seal unit having a casing with a mounting portion and a seal element attachment portion, a resinous contoured seal ring element made of a fluorocarbon resin material and having outer, inner, and intermediate diameters, and inner and outer surface portions with at least one of the innermost and outmost diameter portions being adapted to form a primary seal with an associated machine element and with an intermediate portion of one surface being bonded by an annular elastomeric collar extending between it and the bonding portion of the associated casing.

The invention also achieves its objects by providing a novel seal making method which includes cutting a cylindrical tubular fluorocarbon resin billet so as to form a tapered or frusto-conical seal ring placing this ring and a seal casing in a mold, and forming an annular elastomeric bonding collar extending between one surface of the seal element and the seal casing unit. The method may also include forming one or more hydrodynamic surface formations of one surface of the seal ring element by a coining operation while the ring is supported in a contoured mold unit.

The manner in which these and other objects and advantages of the invention are achieved in practice will become more clearly apparent when reference is made to the accompanying description of the preferred embodiments of the invention set forth by way of example and shown in the accompanying drawings wherein like reference numbers indicate corresponding parts throughout.

BRIEF DESCRIPTION OF THE DRAWINGS

FIG. 1 is a perspective view, with a portion broken away, of a preferred form of seal embodying the invention;

FIG. 2 is an enlarged fragmentary vertical sectional veiw, of the seal of FIG. 1, showing certain principal features of the seal of the invention;

FIG. 3 is a fragmentary front elevational view of a poriton of the seal unit of the invention, taken along lines 3—3 of FIG. 2 and showing the helix formed in the face of the seal ring;

FIG. 4 is a side elevational view of a tubular cylindrical billet of resinous material from which poritons of the seal ring of the invention may be made;

FIG. 5 is a view of the billet of FIG. 4, showing the same after beveled or tapered surfaces are cut on one end thereof;

FIG. 6 is a view of the billet of FIGS. 4 and 5, additionally showing, in exploded relation, the preferred method of manufacturing the resin sealing rings of the invention;

FIG. 7 is an exploded vertical sectional view, with portions broken away, showing the coining die used in making sealing rings according to the invention;

FIG. 8 is a fragmentary vertical sectional view, on a greatly enlarged scale, showing the support fixture and ring forming die of FIG. 7 and showing a scaling ring in position to be coined by the die assembly;

FIG. 9 is an enlarged vertical sectional view, in exploded relation, showing the preferred form of seal making mold used to make seals according to the invention;

FIG. 10 is a fragmentary vertical sectional view of a portion of the mold of FIG. 10, showing the same in the closed position before being filled with elastomer but showing the seal casing and resin ring in position within the mold;

FIG. 11 is a view similar to that of FIG. 10 and showing the seal in the final process of being formed;

FIG. 12 is a vertical sectional view of a portion of the seal of the invention, showing the same installed in position of use with a plurality of associated machine members and acting to retain fluid within a sealed region; and FIG. 13 is a vertical sectional view, with portions broken away, showing an alternate form of seal made according to the invention and showing the seal to be of a unitized construction and to include a wear sleeve as well as a sealing element.

DESCRIPTION OF THE PREFERRED EMBODIMENTS OF THE INVENTION

While it will be understood that the seal of the invention may be embodied in different forms, including both unitized and non-unitized form, and that the sealing action may result from an outer casing with a ring having a radially inwardly directed compressive load, with the excluder lip acting axially, it will also be understood that the seal of the invention may be made in reversed form, that is, with the primary casing on the inside and the sealing lip being urged radially outwardly against companion flange or other sealed surface.

In addition, while the seal may be made with or without an auxiliary lip, and while the generally axially acting auxiliary lip is preferred, the seal is also capable of functioning with the primary lip being an axially directed lip sealing on an end face of an associated machine member. As used herein, and in the claims, "axially inner" means toward the sealed region and "axially outer" means away from the sealed region; "primary" as applied to the lip or seal ring means that which is intended to retain a fluid within the sealed region and "auxiliary" refers to a lip used to exclude contaminants from the area between itself and the vicinity of the primary lip. "Unitized" means or refers to a seal having an intended wearing surface along which the seal band is situated on an accessory or like wear sleeve element which is associated with the principal seal assembly in use. By "secondary" as used herein is meant a seal in the form of a gasket or the like which extends between two relatively immovable or non-rotatable surfaces, commonly those between a portion of the seal casing and the counterbore or the like in which it is mounted, as well, as between a shaft or the like and the accessory or wear sleeve which is mounted for rotation therewith.

Referring now to the drawings in greater detail, FIG. 1 shows the invention to be embodied in a seal unit generally designated 20 and to include a casing unit generally designated 22, a resinous sealing ring unit 24 which is secured to the portion of the casing 22 by an annular elastomeric bonding and locating collar generally designated 26. Referring now in particular to FIG. 2, it is shown that the casing generally designated 22 includes an axially extending mounting flange portion 28 joined at a radius portion 30 to a radially extending flange or bonding portion 32. The resin sealing ring 24 is preferably made from a resinous fluorocarbon material such as a high polymer of tetrafluoroethylene and to be in the form of a tapered, beveled or frusto-conical ring of thin cross-section.

The seal ring 24 includes an active surface 34 and a reverse surface 36, and may be subdivided for purposes of description into an inner diameter portion 38 on which the primary seal band 40 will be formed (see also FIGS. 12 and 13) an outer diameter portion 42 which will form an auxiliary lip generally designated 44, and an intermediate or bonding portion 46.

As shown in FIG. 2 of the drawings, a single spiral groove 48 or a plurality like formations 48 are coined, cut into, or otherwise formed along the active surface 34 of the inner diameter portion 38 of the ring 24. These grooves 48 are hydrodynamic pumping elements whose general nature of operation is known to those skilled in the oil seal art, but whose construction will be described elsewhere herein.

Referring still further to FIG. 2, it is also shown that a cylindrical elastomeric body 50 is formed on the outer surface 52 of the seal mounting flange 28, and that this body includes a plurality of ribs 54 or the like giving a contoured character to the outermost or outside diameter ("OD") mounting surface 56 of the body 50. The elastomer used to form the body 50 is also used to provide a generally annular bumper element 58 having a flat nose portion 60 and being of generally rectangular cross-section. In use, the nose 60 surface may be used to abut a portion of a sealed mechanicam or an associated companion flange as referred to elsewhere herein.

Referring now to another principal element of the invention, the annular collar 26 of elastomeric material used to secure the sealing ring 24 to the casing 22 is shown to include axially inner and outer bonding body portions 62, 64 of thin cross-section, which are spaced apart by the thickness of the flange 32 and which meet at their inner diameters to form an annular center section 66 of the collar 26. A portion of the collar web 26 lying inwardly of the center section 66 is seen to be of increased width and to form an annular mounting pad surface 68 which lies along and is firmly bonded to the intermediate or bonding band portion 46 of the reverse side surface 38 of the resin sealing ring 24.

Referring now to FIG. 12, the seal assembly 20 is shown in a typical installed position of use, with the application being a sealed mechanism generally designated 70 and shown to include a machine member 72 having a counterbore surface 74 which snugly receives the ribs 54 on the outer diameter of the mounting body 50, thus locating the axial flange 28 of the seal casing 22. Also received in the counterbore 74 is an outer race 76 adapted to locate a plurality of tapered roller bearings 78 for example, which also roll along an inner race 80 which is shown for purposes of illustration to be passed over the outer diameter surface 82 of a rotary shaft 84.

The installation also includes a spacer 86 or the like pressed over the shaft 84 and providing an end face surface 88 for engagement by the auxiliary lip 44, as will appear. In the illustrated form, the sealed region is designated 90 and will be assumed to be at least partially filled with a lubricant such as oil or the like, or at least to have its principal parts lubricated by such lubricant in liquid or vapor phase. As shown, a primary seal band 40 is formed where the inner diameter portion 38 of the seal ring 24 is slightly deformed or "bell-mouthed" so as to lie closely over and impart a radial compressive load on the exterior surface 82 of the rotary shaft 84. FIG. 12 also shows the provision of the grooves 48 which lie along the sealed surface. As shown, the primary seal band 40 is formed by contact between the active or inner surface 34 of the ring 24, while the reverse surface 38 is used for bonding and, except for being fluid, gas and vapor impermeable, does not per se form an active sealing surface.

As is further shown in FIG. 12, the end surface 88 on the spacer 86 is shown to be engaged or closely spaced apart from the nose surface 60 on the spacer 58. The auxiliary lip 44 is dimensioned so as to be placed under a slight axial end face load in this installed position, thereby drawing its outer diameter 42 somewhat outwardly and also into a "bell-mouthed" position, enabling it to obtain and maintain a sliding seal fit with the end face surface 88.

Referring now to FIG. 13, an alternate form of seal is shown wherein the seal 20a is shown in a mechanism 70a having a sealed region 90a and shown to include similar parts, including but not limited to, the shaft 84a having the exterior surface 82a bearings and races 76-80a, etc. of its counterpart in FIG. 12. In the embodiment of FIG. 13, however, the seal is shown to include an auxiliary or accessory sleeve 92 having as its principal parts an axially extending wear sleeve mounting sleeve 94 for engaging the seal ring 24, a bend or radius portion 96 and a radially extending combination unitizing flange and auxiliary lip companion flange 98 as well as a small unitizing curl 100. A wear surface 102 is provided on the radially outwardly directed surface of the flange 94 while a ribbed elastomeric mounting body 104 is bonded to the radially inwardly directed surface of this flange 94. In use, the body 104 is press fit over the surface 82a during installation of the seal. The nose portion 60a of the spacer 58a provides the same function as its counterpart in FIG. 12, except that it engages the inner or wearing surface 106 of the flange 98, as does the auxiliary lip surface 44a formed on the outer diameter 42a of the primary seal ring 24a.

Thus, in operation, the seal assembly 20a is shown as being a unitized seal having the accessory sleeve 92 formed therewith and attached thereto by the combination of the radial flange 98 and the curl 100. A further description of the operation of these units appears herein.

Referring now to FIGS. 4–8, certain steps in the preferred method of forming the seal ring of the invention are shown. Referring to FIG. 4, there is shown a flurocarbon billet generally designated 200 which is preferably made from a glass fiber filled high polymer of tetrafluroethylene (TFE), a tough solid material having a lubricous surface and known to those skilled in the art to be suitable for making seal elements. As shown the material is preferably formed into a tubular cylindrical billet having inner side walls 202 and outer side walls 204, made to any convenient length by known methods, including for example, sintering.

It is desired to form the sealing rings such as the rings 24 shown in FIGS. 1–3 and 12 and 13 for use in the invention. Accordingly, by a preferred method, the billet 204 is chucked in a suitable tool and rotated while a knife 206 is manipulated so as to cut a tapered edge or bevel 208 on the billet 200. Thereafter, as shown in FIG. 6, the knife is moved axially downwardly and the process repeated until a plurality of rings 24-1, 24-2, 24-3, etc. are cut or "skived" from the billet 200. These rings are 24-1 to 24-3 for example, are of the general frusto-conical shape shown, having a cylindrical inner edge 210, a cylindrical outer edge 212, and radially inner and outer principal surfaces 214, 216 for example.

Thereafter, it is desired to impart one or more hydrodynamic grooves or like formations into the seal rings 24. Whereas this may be done by cutting grooves with a knife, awl or like instrument, it is preferable in some cases to form the grooves by coining. Accordingly, as shown in FIG. 7, a ring forming die generally designated 220 is used, which includes a support fixture 222, having a tapered, upwardly directed conical face 224 and a cavity 226 for supporting a positioning element 228. The element 228 may also include a beveled surface to aid in centering or otherwise positioning the ring 24. The other element includes a coining dye 232 having a relieved inner surface 234 and a contoured end generally designated 236 and shown to include (FIG. 8) a radially inner land-and-groove portion 238 and a radially outer, flat surface portion 240.

The inner portion 238 includes a plurality of sharpened lands 242 spaced apart from each other by grooves 244. When a ring such as a ring 24 is placed in the die, its inner diameter 212 is sized so as to lie in a notched annual area 246 formed by cooperation between the parts 222, 228. There upon, when the ring forming die 220 is closed under high force or pressure, the lands 242 form grooves the inner diameter margin or active surface portion 34 lying generally on the inner diameter 38 of the ring 24.

The above description of FIGS. 4-8 shows a preferred simple, and effective method of making and coining frusto-conical rings suitable for use with the invention.

Referring now to FIGS. 9-11, a mold assembly generally designated 300 in FIG. 9 is shown for the purpose of molding completed seals using the preformed casing 22 and a precut but not coined ring 24. The mold assembly 300 includes as its principal elements a top plate 302, an inner core 304, an outer core 306, a sprue plate 308, and a seal ring holddown plate 310. FIG. 9 also shows a drawn or stamped casing generally designated 22 to be positioned between the cores 304, 306 and the sprue plate 308, with its axial flange 28 extending downwardly and its radial flange 32 being shown to present what will become an axially inwardly directed surface 33 lying downward for support on the end face portions 312 of a plurality of stamping support bosses 314, as will appear.

Referring now to the core 304, this unit will be seen to include a center recess 316 for receiving a locating pin or dowel 318 for alignment purposes, and to include portions which help define both the outer seal cavity 320 and the inner seal cavity 322. These include an outermost annular surface 324, surmounted by a locating bead 326. Located radially inwardly of the stamping support bosses 314 are contoured surfaces 328 adapted to form a portion of what will become the web 66 in the finished seal. A tapered or beveled resin ring support surface 330 is also provided and terminates at its inner edge in an annular groove 332, upwardly and inwardly of which lies a tapered mating or registration surface 334.

Referring to the outer core 306, it includes a lowermost annular surface 336 above which is a grooved or ribbed surface 338 adapted to form the ribs 54 in the outer diameter of the seal casing 22.

Referring now to the sprue plate 38, it will be noted that this unit is the type of construction preferred for injection molding manufacture of the products, and that it includes, in addition to the lower flat surface 340 adapted to lie upon the surface 341 of the core 306, a tapered sprue 342 terminating at an inlet 344. It will be understood that the sprues 342 are tapered passages spaced apart from each other about the periphery of the cavity formed in part by the sprue plate 308, that radially inwardly thereof is a mold element 344 having a generally cylindrical registration surface 346 below which is a tapered surface 348 having the important function of engaging the outer diameter portion 42 of the seal ring 24. Contoured surfaces, including the surface 350 and 352 are also provided for purposes of defining additional portions of the outer and inner mold cavities 320, 322, as will appear.

Referring now to the seal ring holddown element 310, this will be seen to include opposed flat surfaces 354, 356 enabling it to be stacked with the other elements when the mold is closed. In addition, it includes a upper sprue passage 358 and an annular formation 360 terminating in a pair of bevelled annular surfaces 362, 364. The surface 364 abuts or lies closely spaced apart from its counterpart surface 334 when the mold is closed, while the surface 362 lies along and engages the active surface 34 of the ring 24 when the mold is closed. A plurality of coining formations 366 are shown as lying along the radially inner margin of the surface 362, for in-mold coining, as referred to elsewhere herein.

The outer margin 368 of the surface 362 is in vertical registry with the support surface 34 for the outer diameter 42 of the ring 24. The mold top plate includes the downwardly directed flat surface 370 adapted to engage the surface 346 on the mold part 310 as well as a plurality of radial grooves 372 standing outwardly from and communicating with the main sprue passage 374, through which fluent elastomeric material passes as rubber is injected during manufacture. A plurality of O rings 376, 376a, 376b, are shown to be provided in the respective mold sections and each is received within a groove 378, 378a, etc. in a conventional manner to insure sealing and/or vacuum control when the mold is closed.

Referring now to FIGS. 10 and 11, the manufacture of seals therein, FIG. 10 shows the mold 300 with the elements in the closed position and the stamping 22 being supported on the bosses 314, with its radially innermost surface 35 lying alongside and being engaged with the mold cavity forming surface 324. The bead 326 serves to center the stamping 22. With the mold closed, the construction of the cavity 320 forming the ring around the cylinder or body 50 of elastomer around the outermost portion of the flange 28 can be seen, as can the contours of the cavity 322 in which the various web portions 62, 64 and the collar 66 are formed, which elements terminate at their radially innermost portions in the annular mounting or bonding pad 68 which extends around the intermediate bonding band portion 46 of the ring 24 so as to fix it securely in relation to the casing.

Provision of the groove 332, in combination with the pinching action provided between the surfaces 348 and surfaces 368 on the sprue plate 308 and the holddown plate respectively insure that the ring 24 is held in place properly, and further insure that flash or undesired rubber scrap will not be created radially outwardly of the surface 348, and hence will not lie along the reversed surface portion of the auxilliary lip-forming outer diameter 42 of the seal ring 24.

The mold surface 352 is shown in FIGS. 10 and 11 as being spaced slightly apart from the upper surface of the flange casing 22. It will be understood that this spacing permits fluent rubber to flow from the sprue inlet 344 into the cavity 322. Customarily, there are also provided hold down pins or the like (not shown) to bear against the upper surface of the casing and hold it in place during molding. Being known to those skilled in the art and not forming a part of this invention, these elements are not shown or described in detail. Likewise, the land 314 is discontinuous or has circumferentially spaced apart portions permitting elastomer flow therebetween.

FIG. 11 shows the elements just described with the mold in the closed position with the rubber overflow or "dump" areas 380 filled with rubber and with the mounting diameter body 50 and the annular collar neck portion 66 of the rubber as well as the remaining elements being formed as shown in FIG. 3.

Referring now to another feature of the invention, the provision of the land and groove surface 366 on the radially inner portion of the tapered surface 362 on the hold down ring 310 also serves to coin the plurality of hydrodynamic grooves 48 in the radially inner diameter margin 38 of the seal casing 24.

Accordingly, the mold of the type shown may accommodate and center the casing 22, and with the seal ring 24 inserted therein when the mold is closed, the ring is positioned by the groove 366 and pinched off by the surface 368 so as to remain positioned to accept the high pressure flow of fluent rubber into the cavities 320, 322 to form a seal which includes an outer diameter mounting body portion made from an elastomer as well as a mounting or locating collar portion and mounting pad formation which provides excellent locating and good flexibility in use.

According to the invention, the seal is highly advantageous for several reasons. First, the formation of the primary resinous sealing ring in the manner illustrated enables it to be a preformed frusto-conical tapered or "bell-mouthed" configuration which is ideal for engaging an associated shaft. It achieves this shape in the relaxed or as-formed condition. This not only simplifies assembly, but provides a graduated load extending from the innermost diameter gradually along and to a larger diameter portion of the bevel. The hydrodynamic formations may be, and preferably are, formed as grooves rather than lands as has commonly been done in the past. This allows greatly reduced wear on the active surface of the ring, in as much as the hydrodynamic elements or veins do not extend outwardly from the active surface of the material where they are subjected to wear. The controlled radial compressive load or radially inwardly directed sealing force, particularly with its graduated pressure effect, enables a good static seal to be maintained, as does the formation of the narrow pitch spiral or helix for hydrodynamic purposes. While this narrow pitch or like spiral is not a necessary feature of the invention, it is a pattern which has been particularly successful with this form of seal.

Another feature of the invention is the ability to use a single piece of TFE resin sealing ring or washer to provide an auxiliary or excluder lip seal from the same material. The tapered construction of the primary seal ring as formed permits the auxiliary or excluder lip to be formed on a larger diameter where it can engage an end face surface. This is a preferred form of excluder lip which preferably rides on a surface other than the same shaft which is being sealed by the other than the same shaft which is being sealed by the primary ring. The frusto-conical or tapered construction is ideal from this standpoint.

Another advantage of the invention is that the resin ring may be bonded and located in a highly advantageous manner by the provision of the novel collar which extends between the webs of elastomer extending along the faces of the radial casing flange and the annular band on the reverse or inactive surface of the resin. This collar provides firm but flexible location of the lip as a whole. It provides an excellent bonding surface but it need not undergo significant bending motion leading to premature failure in use. It readily accommodates radial runout and provides a portion of greatly increased flexibility in relation to the modulus of the resin. Accordingly, in a slightly off centered or like shaft which is essentially round but which is not mounted concentrically with the counterbore, the excentricity or radial runout may be accommodated by the elastomer while the resin ring, which is not inherently as flexible, or at least has a greater modulus, can follow the seal surface without undergoing high rate deflection. The collar may be made of any desired thickness, but preferably is relatively thin. It thus provides good centering action because of its geometry, while still providing a relatively thin cross section. It is believed that the flexible collar which is formed of elastomer and, in effect, intersects the surface of the primary seal ring at a substantial angle is an important novel feature of the invention for the type of locating action is provides.

The seal is ideally adapted to both unitized and nonunitized construction, and because in the methods used to make it are highly advantageous. As illustrated in FIGS. 9–11, for example, the seal can be made in a single operation wherein the coining of the hydrodynamic surfaces on the primary ring and molding both a rubber OD and formation of the bonding collar and pad may be accomplished in a single operation. The seal design is suitable for incorporating a rubber OD and is also readily suited to the use of a companion flange or unitizing element which may itself have a rubber ID (inside diameter). As pointed out above, the seal may be readily adapted to reverse type installations where the seal acts radially outwardly, or wherein the part illustrated as the shaft 84 is stationary and the machine part 72 rotates. In such cases, centrifugal forces may be taken advantage of as a sealing perameter. In use, the seal of the invention has proved extremely advantageous in terms of extended wear, ease of manufacture outstanding seal performance and particularly, ease of manufacture. It is not necessary to preform the flurocarbon resin ring by elaborate processes or form it by the use of mandrels and other techniques known to the prior art.

In the above description, the expression "spiral," or "helix" may be used to describe the hydrodynamic formations on the active or seal band surface 34 of the primary ring 24 of the seal.

In this connection, it should be understood that a variety of patterns are effective to bring about the return of oil to the sealed cavity upon rotation of the shaft, or, of course, return lubricant or the like to the sealed cavity in the event it is the seal which rotates and the shaft or the like which stands still. In either case, relative motion between the two serves to "pump" the oil, grease, or other sealed fluid back into the sealed region. In the use of fluorocarbon seals, it has generally been found that a screw thread pattern of fine pitch is preferred, and this form of seal is illustrated in FIGS. 1–3 of the drawings, for example, in these figures, the drawings are intended to illustrate the use of a helix having two or more "starts" that is, two or more points at which one of the grooves 48 intersects the innermost edge portion 210 of the actual seal ring 24. In such case, oil entering any one particular groove along the seal band 40 wil be in communication with oil in the sealed region at the point where the "start" occurs, that is, where the groove 48 intersects the axially innermost edge 210 of the seal ring. In some cases, there may be only a single start, as shown or implied in FIG. 12, for example, but the number of starts or intersections is not a material part of the invention, such features per se being known to the prior art.

Another form of hydrodynamic formation which has proved successful in use is one wherein the formation comprises a part of a spiral of a greatly differing pitch or taper, and in the oil seal art, such formations are often referred to as "helices", that is, as elements of a helix pattern. These separate elements, sometimes also referred to a "vanes", "ribs", or the like, are illustrated, for example in U.S. Pat. No. 4,094,519.

Still further, other hydrodynamic formations, such as triangles, sinuous patterns, or the like may also be used, depending on the preference of the designer.

However, a preferred feature of the present invention is that the formation, particularly if it be of the screw thread, spiral, or helix form, be debossed or grooved into the surface of the seal ring, thereby diminishing wear considerably. In other words, when the major wearing surface 40 contacting the shaft or other sealed surface is free from upstanding or embossed formations, extended life in the use of the seal is made possible. If the formations were raised, for example, they would be exposed to premature wear.

It will thus be seen that the present invention provides improved fluid seals, molds, and methods of manufacture such seals, molds and methods having a number of advantages and characteristics, including those herein pointed out and others which are inherent in the invention. Various preferred forms of the invention having been shown by way of example, it is anticipated that certain changes and modifications may be made to the described form of seals, molds, and methods without departing from the spirit of the invention or the scope of the appended claims.

We claim:

1. A method of manufacturing a composite seal assembly, said method including the steps of cutting from a cylindrical billet of a resinous fluorocarbon material at least one primary sealing ring of generally frustoconical form in its unstressed condition, said ring thereby including first and second principal surface portions, each being inclined with respect to the axis of said billet, one of such surfaces being a first surface directed generally radially inwardly and in a first axial direction, and the second surface being closely spaced apart from the first surface and being directed generally radially outwardly and in an opposite axial direction, supporting the ring thus formed against movement, disposing a relatively rigid annular casing unit adjacent said ring with at least a portion of said ring lying within a central opening in said casing unit, aligning said casing unit so as to have one margin thereof in generally radially aligned relation with a portion of said resin ring, and bonding said casing unit to said seal ring without substantial deformation of said seal ring by molding an elastomeric collar of thin cross-section such that said collar extends between and bonds portions of said second surface of said ring and a part of said casing unit to each other in fluid-tight relation.

2. A method as defined in claim 1 wherein said casing unit includes an axially extending mounting surface and a radially extending flange unit, with said flange unit having an inner margin on each of its axially inner and outer surfaces, and wherein said portion of said collar bonded to said casing is bonded to both of said casing inner margins so as to form a thin web therealong.

3. A method as defined in claim 1 wherein the portion of said second ring surface to which said collar is bonded comprises an annular band of frusto-conical configuration lying generally axially centrally of said ring and comprises not more than about half of the surface of said ring.

4. A method as defined in claim 1 which also includes the step of forming a cylindrical mounting body of said elastomer on said casing so as to provide a rubber mounting surface thereon.

5. A method as defined in claim 1 wherein said ring is positioned with one axial end thereof being axially spaced apart from one end surface portion of said casing so as to provide, in use, an excluder lip end portion on said ring, said excluder lip end being adapted to engage an associated machine member to form an auxiliary seal therewith.

6. A mold assembly for manufacturing a fluid seal, said mold assembly including a first, relatively fixed mold member having surfaces thereon defining at least in part the shape of an article to be manufactured, said surfaces including a radially innermost, generally frustoconical surface having radially inner and outer margins, with said radially innermost margin being adapted to engage one surface of a resinous seal ring placed therein, at least one surface also defining one portion of a cavity for forming an annular collar, and casing support means in the form of a generally radially extending additional annular surface, a second, intermediate mold member having generally annular surfaces directed oppositely to said additional annular surface and in overlying relation to a casing received in said mold, said intermediate member also including at least one inlet for fluent elastomeric material and further including surfaces defining an additional portion of said collar-forming cavity, and a third mold member having a generally frusto-conical surface portion adapted to engage a margin of said seal ring on a face thereof opposite the face engaged by said innermost margin of said fixed mold member, said third mold member having coining land and groove formations thereon for cold forming hydrodynamic grooves in said resinous ring when said mold is in the fully closed position thereof, said mold also permitting, in the closed position thereof, flow of fluent elastomer to fill said collar-forming cavity and bond said casing to said ring unit.

7. A mold assembly as defined in claim 6 which further includes means fixed with respect to said first fixed mold member and which define at least portions of a cavity lying radially outwardly of said casing member and being in communication with said material inlet whereby an outer diameter elastomeric body may be formed on said casing at the same time said collar unit is being formed.

8. A method of manufacturing an oil seal, said method comprising cutting from a cylindrical billet of resinous fluorocarbon material a seal ring of thin cross-section, said seal ring being of frusto-conical configuration in its relaxed condition, placing said seal ring in a first mold part having frusto-conical surfaces registering with and in supporting relation to one surface of said seal ring, coining hydrodynamic formations in the surface of said seal ring opposite said surface supported by said first mold part by movement of a coining die into contact with said opposite surface under a high force, positioning said ring within an opening in an annular seal casing element, and bonding said ring to said element without substantial deformation of said seal ring by the formation of an elastomeric collar having an inner margin portion bonded to the portion of said ring surface which was supported by said first mold part and another margin bonded to a portion of said seal casing, whereby said ring is firmly but resiliently supported generally centrally of said seal casing by a resilient annular collar, and whereby hydrodynamic formations are formed on a generally radially inwardly directed surface of said seal ring for contact with an associated machine member.

* * * * *